Aug. 30, 1955 W. MASSMANN 2,716,510
DOSING APPARATUS

Filed Aug. 16, 1950 2 Sheets-Sheet 1

INVENTOR.
WILHELM MASSMANN
BY

Aug. 30, 1955

W. MASSMANN 2,716,510

DOSING APPARATUS

Filed Aug. 16, 1950

INVENTOR.
WILHELM MASSMANN
BY

United States Patent Office 2,716,510
Patented Aug. 30, 1955

2,716,510
DOSING APPARATUS

Wilhelm Massmann, Dusseldorf, Germany, assignor to Benz & Hilgers Maschinenfabrik, Dusseldorf, Germany, a firm Application August 16, 1950, Serial No. 179,809

Claims priority, application Germany August 22, 1949

8 Claims. (Cl. 222—227)

This invention concerns an apparatus for dosing and filling of liquid, semi-liquid or easily moulded materials, in which the materials for dosing, for example, soft soap, jam, oils, fats, pastes etc., are fed to the dosing chamber under pressure, for example by screw conveyors, and is principally concerned with such dosing apparatus in which the dosing chamber is determined by the stroke of a piston or the distance between two pistons movable to and fro within a cylinder.

With known apparatus which has dosing pistons reciprocating within a cylinder, the filling and emptying apertures are not arranged directly opposite each other, but are displaced at varying distances from each other, so that after each filling or emptying operation the dosing chamber must be transferred from the range of the filling position to the range of the emptying position and vice versa by axial movement of the dosing cylinder, or, if the latter is arranged in a fixed position, through parallel movement of the two pistons within the cylinder. The side by side arrangement of the emptying apertures in relation to the filling apertures has been necessary up to the present in order to bring the dosing chamber from the filling position into the emptying position or vice versa by means of the relative movement between the cylinder and piston.

Either with or without the additional suction or pressure of the dosing piston or pistons, the time needed for conveying the material to be dosed into the dosing chamber and from this into the container to be filled, or with easily moulded materials, into the packing chamber or packing shape, is more than proportionally extended through the double shifting movement of the dosing chamber from the filling into the emptying position and from this again into the filling position. This is not only tedious but also decreases the performance and economic value of the dosing apparatus.

A further disadvantage of known apparatus is the fact that for the whole time during which the dosing chamber is brought into the emptying position, and, when the emptying operation is completed, brought back into the filling position, the screw conveyors are at a standstill, or alternatively the pressure filling feed has to be switched off. When the dosing chamber has returned to the filling position, the supply to the dosing chamber has to be switched on again. This interrupted operation necessitates complicated and expensive apparatus and results in an excessive consumption of power. The machine does not run smoothly, whereby not only the materials for filling suffer, but the apparatus is subjected to considerable wear and tear.

All these disadvantages and difficulties are removed by the present invention by the fact that the dosing cylinder is provided with two dosing chambers separate from each other. These chambers are switched to the filling and emptying position alternatively by rotation of the dosing cylinder about its centre axis. In this way the two separated dosing chambers are brought into contact through their respective ports, alternately with the material container and the filling form, or the filling pipe leading to the filling form and are each filled and emptied by a suction or a pressure piston.

It is preferable that the separation of the dosing chambers be in the form of a common inclined wall, which facilitates flow of material to be dosed, into and out of said chambers.

This method of construction according to the invention has the advantage not only of eliminating the loss of time which up to now has been inevitably caused by the to and fro movement of the dosing chamber, but also of achieving a gain of time, by the fact that by employing two dosing chambers, one chamber may be made to fill itself at the same time as the other empties itself.

A further advantage of the invention is that the switching over process requires only a minimum of time, and the feed of the filling materials to the dosing cylinder need no longer be interrupted by switching off the feed or the screw conveyor drive.

In order to avoid recoils or impacts at the moment of completed filling of one dosing chamber and subsequent switch over of the dosing cylinder, according to the invention, an additional cylinder together with a piston which is under spring pressure has been introduced, either at the pressure feed inlet or at the outlet of the material container, into which the filling materials can be taken up temporarily during the switch over of the dosing cylinder. The pressure increase occurring at the feed or at the material container outlet at the moment of completion of filling of one dosing chamber can be favourably utilised for the switching over of the dosing cylinder.

The invention will be further described by way of example with reference to the accompanying drawings in which.

Figure 1:
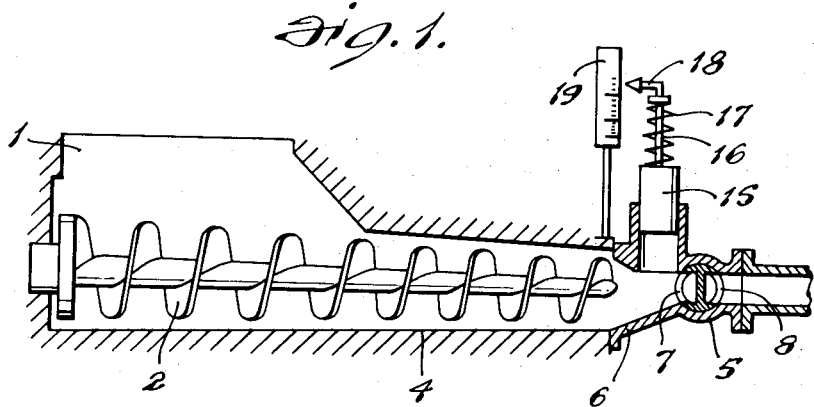
Fig. 1 is a longitudinal section of a dosing apparatus incorporating screw conveyor drive, and constructed according to the invention.
Figure 2:
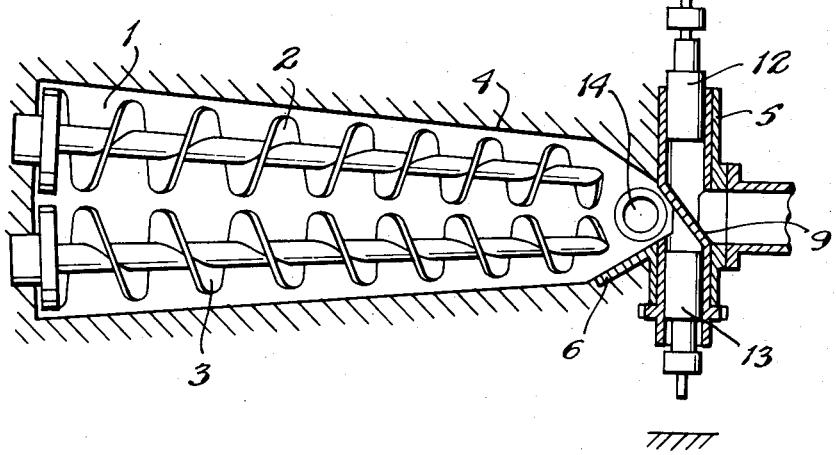
Fig. 2 is a section along the lines 2—2 of Fig. 1.
Figure 6:
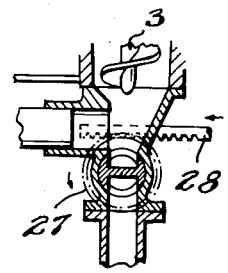
Fig. 6 is a fragmentary section along the lines 6—6 of Fig. 3.

Semi-liquid or easily moulded materials are introduced into a material container 1 and are fed by means of screw conveyors 2 and 3, fitted with right and left handed threads respectively through a container outlet 4 to a dosing cylinder 5 via a distance piece 6. The outlet of the material container 4 can be arranged either horizontally, slanted or vertical in respect of the dosing cylinder, or in the case of liquid materials replaced by a pressure feed connected to the dosing cylinder 5. The dosing cylinder 5 is provided with two openings 7 and 8 which are opposite to each other and which are separated by an inclined wall 9. The dosing cylinder 5 is divided by the transverse wall 9 into two chambers 10 and 11 which are limited on opposite ends by pistons 12 and 13, and so form the dosing chambers.

The distance piece 6 incorporates a cylinder 14 in which there is a piston 15 under pressure of a spring 17. The piston 15 is displaced against the pressure of the spring 17 by an increase of pressure in the container outlet, or in the distance piece 6, so that when the dosing chambers are filled up, materials which are still being fed can pass into the cylinder 14.

The advantage of this is that the screw drive will not have to be switched off when the dosing chamber connected to the container 4 has been filled and the dosing cylinder 5 is being switched over.

Fitted to the end of the piston 15 is a piston rod 16 carrying an arrow 18 which moves along a scale 19. In this way the length of the piston stroke can be observed continuously. The proper functioning of the entire dosing apparatus can be controlled by the movement, or stroke of the relief piston 15. For example, in the event of a material shortage or the screw conveyors rotating too slowly, the relief piston would either remain in its original position or only rise slightly, whilst too fast a rotation of the screw conveyors can be recognised by abnormal stroke of the piston. In all these cases, depending on the stroke 1 of the piston rod 16, the screw conveyor drive can be switched off, or as necessary, the speed of revolution of the screws may be increased or decreased.

Figure 4:
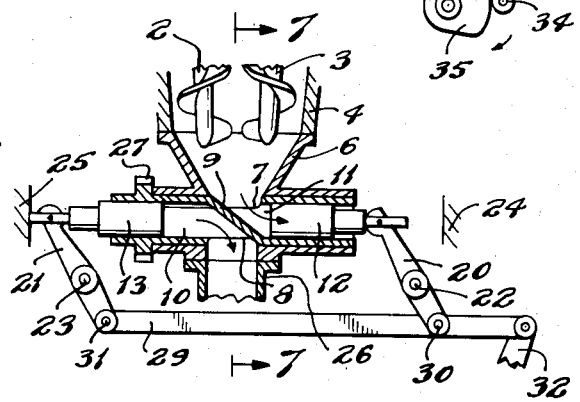
Figure 8:
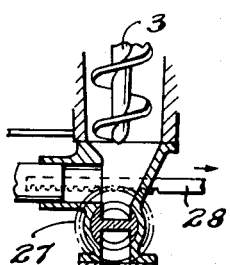
Fig. 8 is a fragmentary section along the lines 8—8 of Fig. 5.
Figure 5:
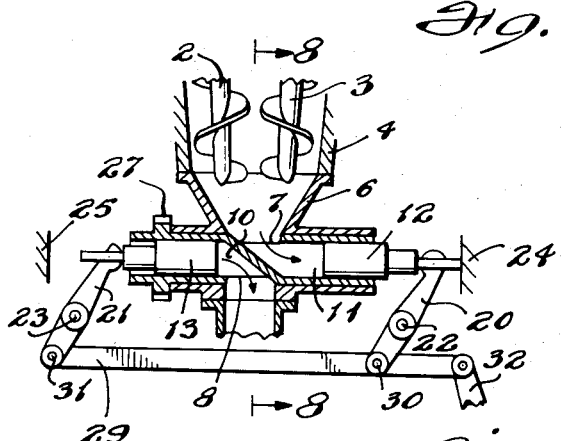

The apparatus described above, works as follows:

In Fig. 4, the materials put into the container are fed by aid of continuously rotating screw conveyors through the container outlet 4 and the distance piece 6 to the dosing cylinder 5, and enter through the cylinder opening 7 into the chamber 11, between the inclined wall 9 and the piston 12, which as shown is at the inner end position. On filling of the right hand dosing chamber 11, the piston 12 is engaged by a drive, with aid of an engaging lever 20 which is swingable round a fulcrum 22, and brought into its outer end position, as shown in Fig. 5, thereby exerting a sucking effect on the materials coming from the container 4. The piston, the movement of which is limited by an adjustable detent member 24, has opened the dosing chamber 11 at this end position to such an extent that an excess of material for dosing is present in the chamber. During the filling process on the right hand side of the cylinder, a reversed, emptying process takes place in the left hand side of the cylinder.

At the beginning of the emptying process on the left hand side of the cylinder, as shown in Fig. 4, the piston 13 is at its outer end position, which is determined by the adjustable detent member 25. The piston 13 is moved to the right by an engaging member arm or lever 21, which is swingable around its axis 23, and presses the material stored in the dosing chamber 10 through the cylinder opening 8 into the emptying pipe 26, whereby the quantity of material being emptied from the dosing chamber is determined solely by the length of the piston stroke. As the piston stroke is adjustable, very exact dosing of the materials can be undertaken in this way.

Figure 3:
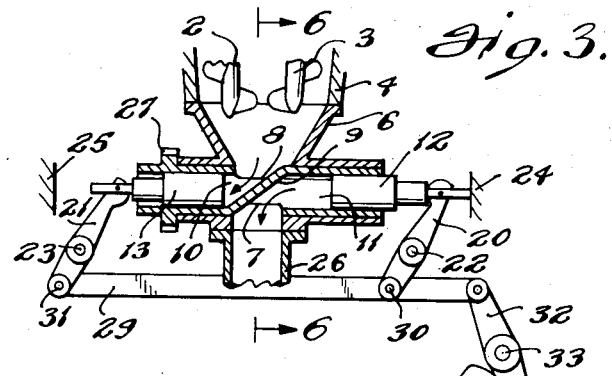
Figs. 3, 4 and 5 are detailed sectional views of a dosing chamber, showing three different phases of the filling and emptying processes.
Figure 7:
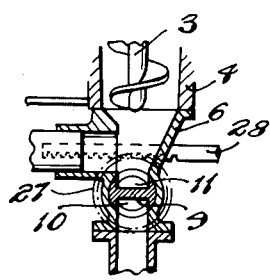
Fig. 7 is a fragmentary section along the lines 7—7 of Fig. 4.

After the filling of chamber 11 and the simultaneous emptying of chamber 10 has taken place, and the two pistons 12 and 13 are in the positions illustrated in Fig. 5, the switch over takes place by axial rotation of the dosing cylinder 5 by 180 degrees whereby the switching position, as illustrated in Fig. 3, is reached.

Now the above described filling and emptying process takes place in the same manner, but on the opposite sides of the dosing cylinder, whereby each filling process on the one side of the cylinder, corresponds with the emptying process on the other side of the cylinder. Running without load is completely obviated, so that with this invention the output can be increased.

The rotation of the cylinder 5 is performed in predetermined intervals in accordance with the requirements for the particular material and in order to achieve this end the cylinder 5 carries an outer gear 27 which meshes a rack 28. The latter performs a reciprocating movement at predetermined intervals by suitable means (not shown), so that at the proper time either the chamber 10 or the chamber 11 assumes the filling position.

The reciprocating movement of the pistons 12 and 13 is brought about by the levers 20 and 21, which engage the respective pistons 12 and 13. The levers 20 and 21 are pivoted at the points 22 and 23, respectively, and their outer ends are connected to a link 29 by means of pivots 30 and 31, respectively. One end of the link 29 is connected to a lever 32 which turns on a pivot 33, while its other end carries a roller 34 which engages a rotating cam 35. Depending upon the position of the cam 35, the link 29 and, thereby, the pistons 12 and 13 will perform reciprocating movements in regular cycles to assume the filling and emptying positions, respectively.

When dosing liquid material, it is advisable to connect the filling and emptying openings of the dosing cylinder, and also the pressure feed ducts and emptying ducts, in such a manner that the emptying of the dosing chambers always takes place upwards.

I claim:

1. A dosaging apparatus for easily-moulded and like materials comprising in combination a container, a dosing cylinder at one end of said container, conveyor means within said container adapted for feeding material under pressure from said container to said dosing cylinder, said dosing cylinder being divided into two entirely separate dosing chambers and being rotatable upon its own longitudinal axis so as to bring each said dosing chamber successively into a filling position and then into an emptying position, adjustable means for dosing the said material into one of the chambers of the said cylinder being in the filling position and pressure means for emptying the said material from the other of the chambers of the said cylinder being in the emptying position, and said container having a dispensing outlet alternately in communication with either one of said dosing chambers.

2. A dosaging apparatus as set forth in claim 1 in which said conveyor means consists of screw conveyor means.

3. A dosaging apparatus for easily-moulded and like materials comprising in combination a container, a dosing cylinder divided by a common inclined wall into two separate dosing chambers, the said dosing cylinder being disposed at one end of the said container, said inclined wall facilitating flow of material into and out of said chambers, said cylinder being rotatable upon its own longitudinal axis so as to bring each said dosing chamber successively into a filling and then into an emptying position, screw conveyor means within said container adapted for feeding material from said container to said dosing chambers, adjustable means for dosing the said material into one of the chambers of the said cylinder being in the filling position and pressure means for emptying the said material from the other of the chambers of the said cylinder being in the emptying position, and said container having a dispensing outlet alternately in communication with either one of said dosing chambers.

4. A dosaging apparatus for easily-moulded and like materials comprising in combination a container, a dosing cylinder divided by a common inclined wall into two separate dosing chambers, the said dosing cylinder being disposed at one end of the said container, said inclined wall facilitating flow of material into and out of said chambers, said cylinder being rotatable upon its own longitudinal axis so as to bring each said dosing chamber successively into a filling and then into an emptying position, screw conveyor means within said container adapted for feeding material from said container to said dosing chambers, adjustable means for dosing the said material into one of the chambers of the said cylinder being in the filling position and pressure means for emptying the said material from the other of the chambers of the said cylinder being in the emptying position, said container having a dispensing outlet alternately in communication with either one of said dosing chambers, a piston provided in said dosing chambers, said piston being used for the purpose of filling said dosing chamber with material, to constitute the said adjustable dosing means, when said chamber is in said filling position, and for the purpose of emptying said chamber, to constitute the said pressure means, when said chamber is in said emptying position.

5. A dosaging apparatus as set forth in claim 4 in which the strokes of said pistons are limited by detent means, said detent means being adjustable in such a manner as to govern the lengths of stroke of said pistons, whereby a desired quantity of material is displaced upon each reciprocation of said pistons.

6. A dosaging apparatus for easily-moulded and like materials comprising in combination a container, a dosing cylinder divided by a common inclined wall into two separate dosing chambers, said inclined wall facilitating flow of material into and out of said chambers, said cylinder being rotatable so as to bring each said dosing chamber successively into a filling and then into an emptying position, pistons for the purpose of filling and then emptying said chambers, detent means, adjustable in such a manner as to govern the strokes of said pistons, whereby a desired quantity of material is displaced by each reciprocation of said pistons, screw conveyor means adapted for feeding material from said container to said dosing chamber, a cylinder and piston adapted at the outlet of said container outlet, which, at the moment of filling of one of said dosing chambers, and during subsequent rotation of said dosing cylinder to bring the said other dosing chamber to said filling position, will act as a temporary reservoir for material fed by said means and said container having a dispensing outlet alternately in communication with either one of said dosing chambers.

7. A dosaging apparatus for easily-moulded and like materials comprising in combination a container, a dosing cylinder divided by a common inclined wall into two separate dosing chambers, said inclined wall facilitating flow of materials into and out of said chambers, said cylinder beinig rotatable so as to bring each said dosing chamber successively into a filling and then into an emptying position, pistons for the purpose of filling and then emptying said chambers, detent means, adjustable in such a manner as to govern the stroke of said pistons, whereby a desired quantity of material is displaced by each reciprocation of said pistons, screw conveyor means adapted for feeding material from said container to said dosing chamber, a cylinder and piston adapted at the outlet of said container, which, at the moment of filling of one of said dosing chambers, and during subsequent rotation of said dosing cylinder to bring said other dosing chamber to said filling position, will act as a temporary reservoir for material fed by said conveyor means, switch means whereby increase of pressure in said material which occurs at the moment of filling of one of said dosing chambers is utilised for the purpose of rotating said dosing cylinder to bring said filled chambers to its emptying position and said container having a dispensing outlet alternately in communication with either one of said dosing chambers.

8. A dosaging apparatus for liquid material comprising in combination a container, a dosing cylinder above said container, pressure means adapted for feeding said liquid material from said container upward to said dosing cylinder, said dosing cylinder being divided into two separate dosing chambers and being rotatable upon its own longitudinal axis so as to bring each said dosing chamber successively into a filling and then into an emptying position, adjustable means for dosing the said material into one of the chambers of the said cylinder being in the filling position and pressure means for emptying the said material from the other of the chambers of the said cylinder being in the emptying position, and said container having a dispensing outlet alternately in communication with either one of said dosing chambers.

References Cited in the file of this patent
UNITED STATES PATENTS

| | | |
|---|---|---|
| 576,934 | Ahrenbeck | Feb. 9, 1897 |
| 1,296,788 | Frederick | Mar. 11, 1919 |
| 1,648,554 | Lundin et al. | Nov. 8, 1927 |
| 1,669,976 | De Leeuw | May 15, 1928 |
| 1,859,290 | Davis | May 24, 1932 |
| 1,861,734 | Bergmann | June 7, 1932 |
| 2,116,865 | Kendall | May 10, 1938 |

FOREIGN PATENTS

| | | |
|---|---|---|
| 242,932 | Germany | Jan. 29, 1912 |